(12) United States Patent
Sun et al.

(10) Patent No.: US 11,524,775 B2
(45) Date of Patent: Dec. 13, 2022

(54) ROTOR-WING ASSEMBLY AND UNMANNED AERIAL VEHICLE

(71) Applicant: SZ DJI TECHNOLOGY CO., LTD., Shenzhen (CN)

(72) Inventors: Liang Sun, Shenzhen (CN); Tao Peng, Shenzhen (CN); Xiaokai Guo, Shenzhen (CN); Di Ou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 895 days.

(21) Appl. No.: 16/401,930

(22) Filed: May 2, 2019

(65) Prior Publication Data
US 2019/0256204 A1    Aug. 22, 2019

Related U.S. Application Data

(63) Continuation of application No. PCT/CN2016/105769, filed on Nov. 14, 2016.

(51) Int. Cl.
| | |
|---|---|
| *B64C 27/473* | (2006.01) |
| *B64C 39/02* | (2006.01) |
| *B64C 27/08* | (2006.01) |
| *B64C 11/04* | (2006.01) |

(52) U.S. Cl.
CPC ............ *B64C 27/473* (2013.01); *B64C 11/04* (2013.01); *B64C 27/08* (2013.01); *B64C 39/024* (2013.01); *B64C 2201/024* (2013.01); *B64C 2201/108* (2013.01)

(58) Field of Classification Search
CPC ....... B64C 27/473; B64C 27/48; B64C 27/08; B64C 39/024; B64C 2201/024; B64C 2201/108; B64C 11/04
See application file for complete search history.

(56) References Cited

U.S. PATENT DOCUMENTS

| | | | |
|---|---|---|---|
| 9,057,273 B2* | 6/2015 | Wang | B64C 11/04 |
| 9,079,115 B2* | 7/2015 | Huang | A63H 27/02 |
| 2016/0001879 A1 | 1/2016 | Johannesson et al. | |

(Continued)

FOREIGN PATENT DOCUMENTS

| | | |
|---|---|---|
| CN | 202966659 U | 6/2013 |
| CN | 103921937 A | 7/2014 |

(Continued)

OTHER PUBLICATIONS

World Intellectual Property Organization (WIPO) International Search Report for PCT/CN2016/105769 dated Aug. 18, 2017 6 Pages.

*Primary Examiner* — Assres H Woldemaryam
*Assistant Examiner* — Aaron M Rodziwicz
(74) *Attorney, Agent, or Firm* — Anova Law Group, PLLC

(57) ABSTRACT

A rotor-wing assembly includes a motor, a propeller, and a connection assembly connecting the propeller to the motor. The motor includes a rotating portion. The connection assembly includes a locking member and a reinforcing member arranged between the propeller and the motor. The locking member locks the propeller to the rotating portion. A first end of the reinforcing member is mounted at the rotating portion. A second end of the reinforcing member opposite to the first end is engaged with the locking member, to reinforce the locking member to lock the propeller to the rotating portion.

19 Claims, 6 Drawing Sheets

(56) References Cited

U.S. PATENT DOCUMENTS

| | | | | |
|---|---|---|---|---|
| 2017/0233062 A1* | 8/2017 | Li | .......................... | A63H 27/02 |
| | | | | 416/209 |
| 2017/0233063 A1* | 8/2017 | Zhao | ....................... | B64C 11/02 |
| | | | | 403/322.2 |
| 2017/0240267 A1* | 8/2017 | Tao | .......................... | F16D 1/112 |

FOREIGN PATENT DOCUMENTS

| | | |
|---|---|---|
| CN | 204279920 U | 4/2015 |
| CN | 204433073 U | 7/2015 |
| CN | 105173072 A | 12/2015 |
| CN | 204956919 U | 1/2016 |
| CN | 105366041 A | 3/2016 |
| CN | 205113705 U | 3/2016 |
| CN | 105517892 A | 4/2016 |
| CN | 205168894 U | 4/2016 |
| CN | 105799916 A | 7/2016 |
| CN | 205469777 U | 8/2016 |
| DE | 10020839 A1 | 10/2001 |
| WO | 2014141154 A1 | 9/2014 |
| WO | 2016070335 A1 | 5/2016 |

* cited by examiner

ROTOR-WING ASSEMBLY AND UNMANNED AERIAL VEHICLE

CROSS-REFERENCE TO RELATED APPLICATION

This application is a continuation of International Application No. PCT/CN2016/105769, filed on Nov. 14, 2016, the entire contents of which are incorporated herein by reference.

TECHNICAL FIELD

The present disclosure generally relates to the field of aircraft, and more particularly to a rotor-wing assembly and an unmanned aerial vehicle.

BACKGROUND

In related technologies, an unmanned aerial vehicle (UAV) includes a motor, and a locking member arranged at the motor. After rotating relative to the motor, the locking member engages with a locking catch of a propeller of the UAV, thus restricting the movement of the propeller with respect to the motor and facilitating disassembly and assembly of the propeller. However, due to vibration generated during flight of the UAV, the locking member and the propeller are disengaged, which causes the propeller to fly off the motor and affects the normal flight of the UAV.

SUMMARY OF THE DISCLOSURE

One aspect of the present disclosure provides a rotor-wing assembly. The rotor-wing assembly includes a motor, a propeller, and a connection assembly connecting the propeller to the motor. The motor includes a rotating portion. The connection assembly includes a locking member and a reinforcing member arranged between the propeller and the motor. The locking member locks the propeller to the rotating portion. A first end of the reinforcing member is mounted at the rotating portion. A second end of the reinforcing member opposite to the first end is engaged with the locking member, to reinforce the locking member to lock the propeller to the rotating portion.

Another aspect of the present disclosure provides an unmanned aerial vehicle. The unmanned aerial vehicle includes a rotor-wing assembly. The rotor-wing assembly includes a motor, a propeller, and a connection assembly connecting the propeller to the motor. The motor includes a rotating portion. The connection assembly includes a locking member and a reinforcing member arranged between the propeller and the motor. The locking member locks the propeller to the rotating portion. A first end of the reinforcing member is mounted at the rotating portion. A second end of the reinforcing member opposite to the first end is engaged with the locking member, to reinforce the locking member to lock the propeller to the rotating portion.

Figure 1:
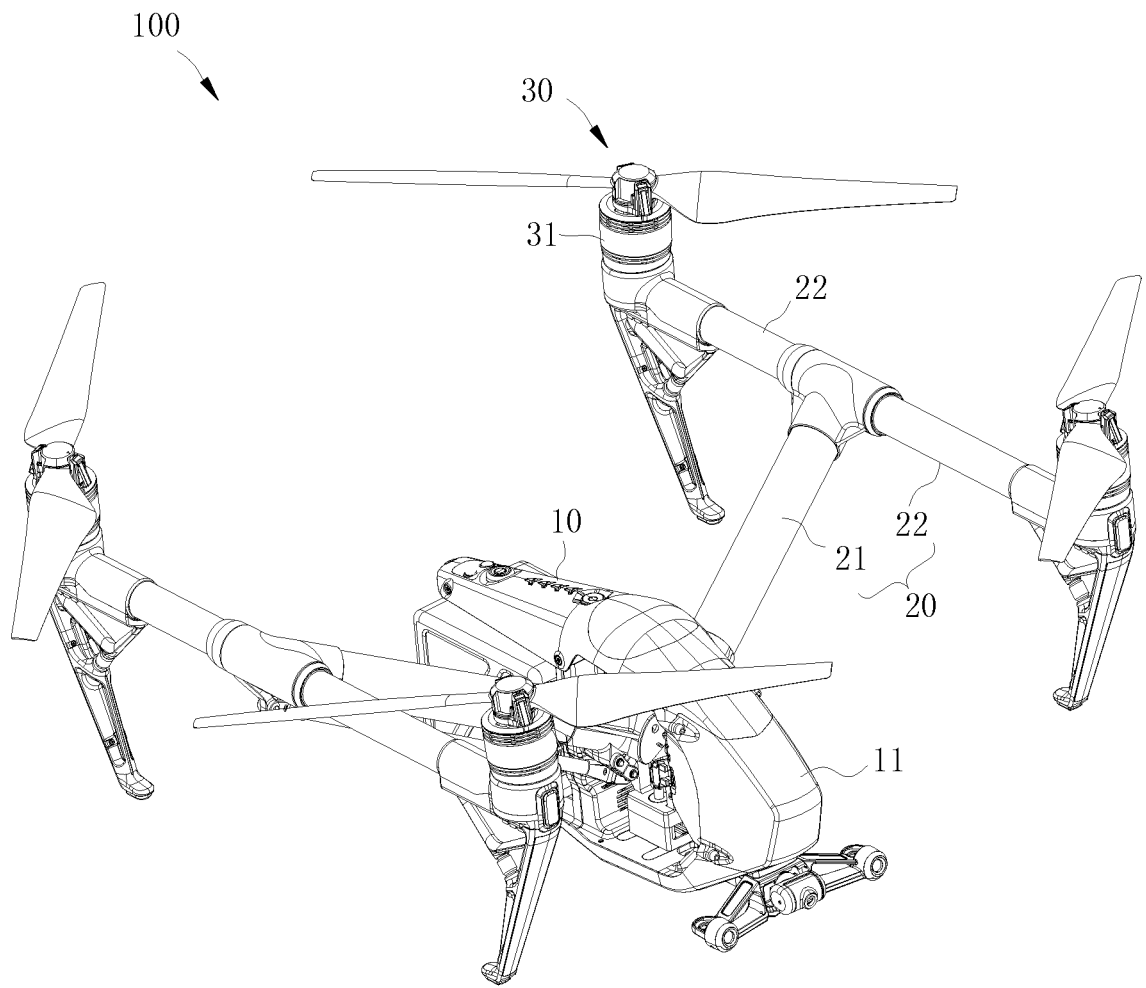
FIG. 1 illustrates a schematic perspective view of an exemplary unmanned aerial consistent with disclosed embodiments.

DESCRIPTION OF SYMBOLS OF MAIN COMPONENTS unmanned aerial vehicle 100;
fuselage 10, housing shell 11;
arm 20, main arm 21, branch arm 22;
rotor-wing assembly 30;
motor 31, rotating portion 312, central axis 31a of motor, first position-limiting structure 3121, position-limiting groove 3121, guide-rail groove 3122, end surface 3123, position-limiting hole 3124, heat-dissipating hole 3125;
propeller 32, rotation axis 32a of propeller, hub, 321, connection hole 3211, mounting hole 3212, first alignment mark 3213, peripheral wall 3214, blade 322, first locking block 323, first mating surface 3231;
connection assembly 33, locking member 331, mounting portion 3311, guiding portion 3312, guiding section 33121, holding section 33122;
locking catch 3313, second locking block 33131, second mating surface 33132, top surface 33133, first side surface 33134, second side surface 33135, recess 33136, engaging hole 33137, second alignment mark 33138;
reinforcing member 332, first end 3323, second end 3324, second position-limiting structure 3321, position-limiting block 3321, engaging hook 3322, engaging portion 33221, contact portion 33222, connection arm 3325;
connection member 333, connection plate 3331, position-limiting shaft 3332, reinforcing block 3333, position-limiting post 3334.

DETAILED DESCRIPTION

The embodiments of the present disclosure will be described in detail below. The examples of the embodiments are illustrated in the accompanying drawings, in which the same or similar reference numerals are used to refer to the same or similar elements or elements having the same or similar functions. The embodiments described below by reference to the accompanying drawings are exemplary and intended to provide explanation of the present disclosure, which cannot be construed as the limitation of the present disclosure.

In the description of the present disclosure, the terms "first" and "second" are used for descriptive purposes only, which cannot be construed as indicating or implying a relative importance, or implicitly specifying the number of the indicated technical features. Thus, the features defined with "first" and "second" may explicitly or implicitly include one or more features. In the description of the present disclosure, "a plurality of" means two or more than two, unless specifically stated otherwise.

In the description of the present disclosure, unless specifically stated and limited, the terms "mounting," "joining," "connection" should be understood in a broad sense, such as, a fixed connection, a detachable connection, or an integral connection; a mechanical connection, an electrical connection, or a communicative connection; a direct connection, an indirect connection through an intermediate medium, an internal connection of two elements, or an interaction of two elements. For those ordinary skilled in the art, the specific meanings of the foregoing terms in the present disclosure can be understood on a case-by-case basis.

The following disclosure provides many different embodiments or examples for implementing different structures of the present disclosure. For simplifying the present disclosure, the components and arrangements of the specific examples are described below. They are merely examples and are not intended to limit the disclosure. In addition, the present disclosure may repeat the reference numerals and/or letters, which is for the purpose of simplicity and clarity and does not itself indicate the relationship between the various embodiments and/or settings discussed. Moreover, the present disclosure provides examples of various specific processes and materials, however, those ordinary skilled in the art can realize the use of other processes and/or the use of other materials. FIG. 1 illustrates a schematic perspective view of an exemplary unmanned aerial (UAV) 100 consistent with disclosed embodiments. As shown in FIG. 1, the UAV 100 is a rotor-wing UAV. The UAV 100 can fly and hover in the air to perform specific tasks, such as flight, tracking, monitoring, exploration, search and rescue, sowing, spraying pesticides, firefighting, and aerial photography. The UAV 100 may be equipped with modules having predetermined functions, such as a sensor, a photographing device, and a medical kit, to achieve specific functions.

The UAV 100 includes a fuselage 10, one or more arms 20, and one or more rotor-wing assemblies 30. The one or more arms 20 are installed at the fuselage 10. The one or more rotor-wing assemblies 30 are installed at the one or more arms 20 and arranged around the fuselage 10. In some embodiments, as shown in FIG. 1, the UAV 100 is a quad-rotor type of UAV. Accordingly, the number of the rotor-wing assemblies 30 is four. The four rotor-wing assemblies 30 may be centrally symmetrical about the vertical central axis of the fuselage 10 to balance the UAV 100 in flight.

In some other embodiments, the number of the rotor-wing assemblies 30 may be set as other numbers according to actual needs. For example, the number of the one or more rotor-wing assemblies 30 may be one, two, three, six, or eight, or more.

The fuselage 10 may serve as a carrier of the UAV 100. Components, such as sensors, circuit boards, processors, communication circuits, and batteries, may be carried outside and/or inside the fuselage 10. In some embodiments, as shown in FIG. 1, the fuselage 10 includes a housing shell 11. A housing space to accommodate the foregoing components may be formed inside of the housing shell 11. The housing shell 11 may be streamlined to reduce air resistance in flight. In some other embodiments, the housing shell 11 may be of another shape, such as a polygonal shape, a circular shape, or an elliptical shape. The housing shell 11 may also be removed and the fuselage 10 may be formed only by overlapping brackets.

The one or more arms 20 may support the one or more rotor-wing assemblies 30 to surround the fuselage 10 in a predetermined pattern. In some embodiments, as shown in FIG. 1, the number of the one or more arms 20 is two. Each arm 20 supports two rotor-wing assemblies 30, and includes a main arm 21 and a branch arm 22. One end of the main arm 21 is connected to the fuselage 10, and the other end of the main arm 21 is connected to the branch arm 22. The main arm 21 and the branch arm 22 are connected to each other in a T shape. The two rotor-wing assemblies 30 corresponding to each arm 20 are arranged at two ends of the corresponding branch arm 22, respectively.

In some other embodiments, the number of the arms 20 may be identical with the number of the rotor-wing assemblies 30, i.e., each arm 20 may support one rotor-wing assembly 30. In these embodiments, the branch arm 22 can be omitted and the rotor-wing assembly 30 may be directly arranged at the end of the main arm 21.

Figure 2:
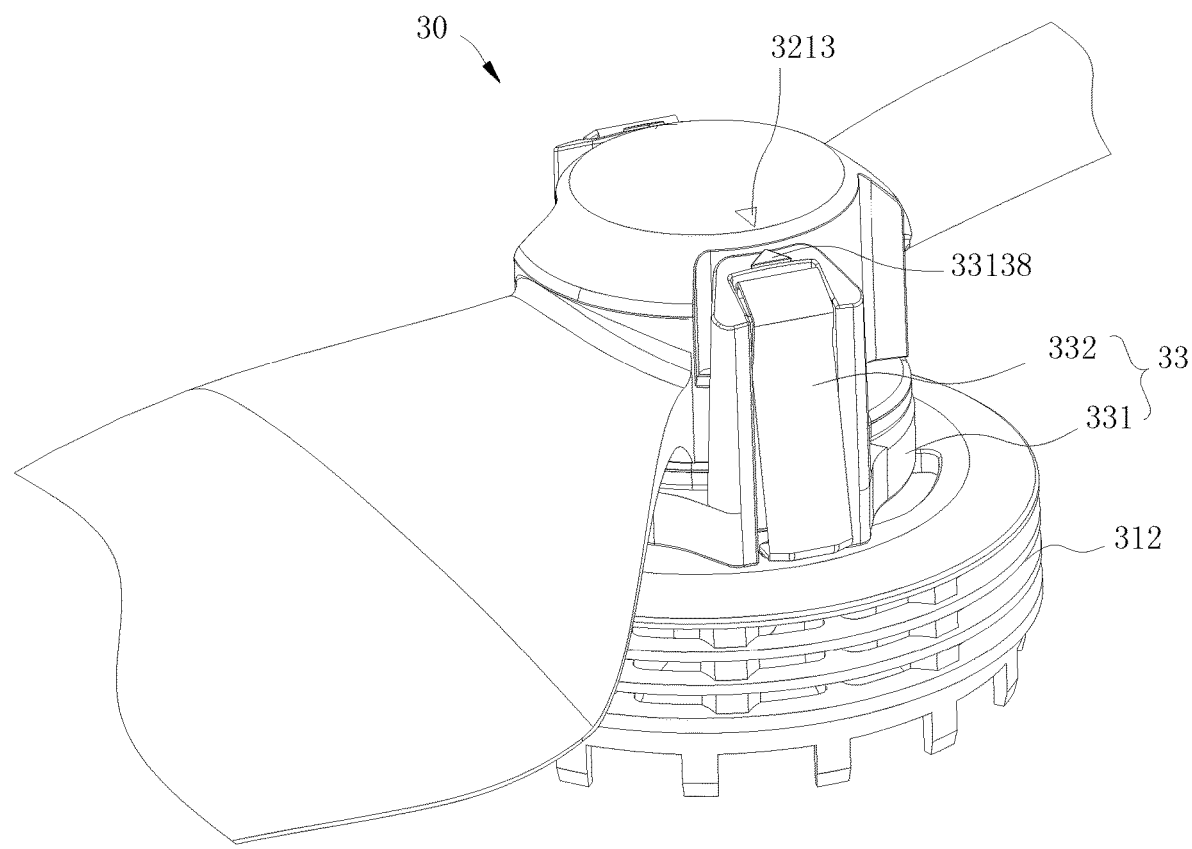
FIG. 2 illustrates a schematic perspective view showing an exemplary rotor-wing assembly of an exemplary unmanned aerial vehicle consistent with disclosed embodiments.
Figure 3:
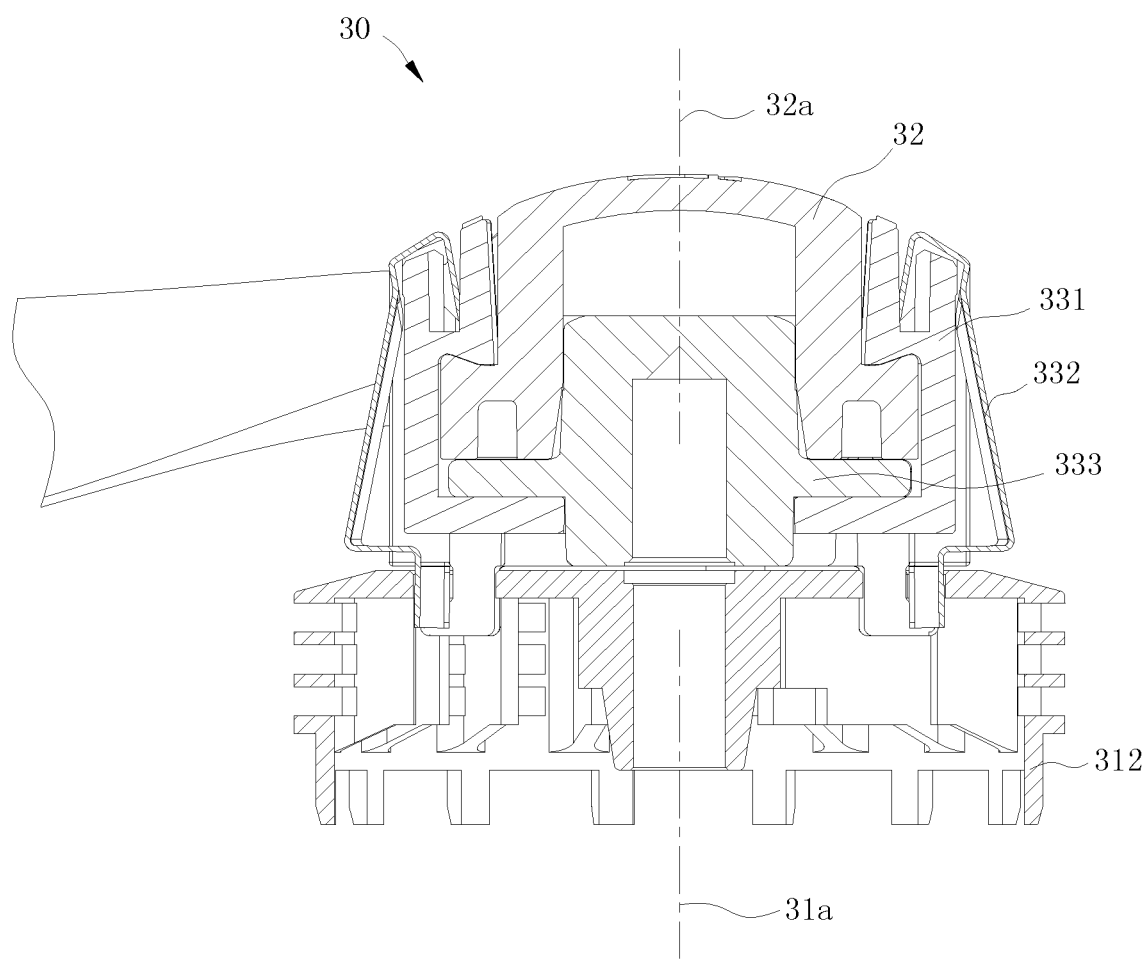
FIG. 3 illustrates a schematic cross-sectional view showing the exemplary rotor-wing assembly of FIG. 2.

FIG. 2 illustrates a schematic perspective view showing an exemplary rotor-wing assembly 30 of an exemplary unmanned aerial vehicle 100 consistent with disclosed embodiments. FIG. 3 illustrates a schematic cross-sectional view showing the exemplary rotor-wing assembly 30 of FIG. 2. As shown in FIG. 1, FIG. 2, and FIG. 3, the rotor-wing assembly 30 includes a motor 31, a propeller 32, and a connection assembly 33. The connection assembly 33 connects the propeller 32 to the motor 31.

In some embodiments, the motor 31 may be any type of suitable motor, such as a brushless motor or a brush motor. As shown in FIG. 3, a central axis 31a of the motor 31 coincides with a rotation axis 32a of the propeller 32.

Figure 4:
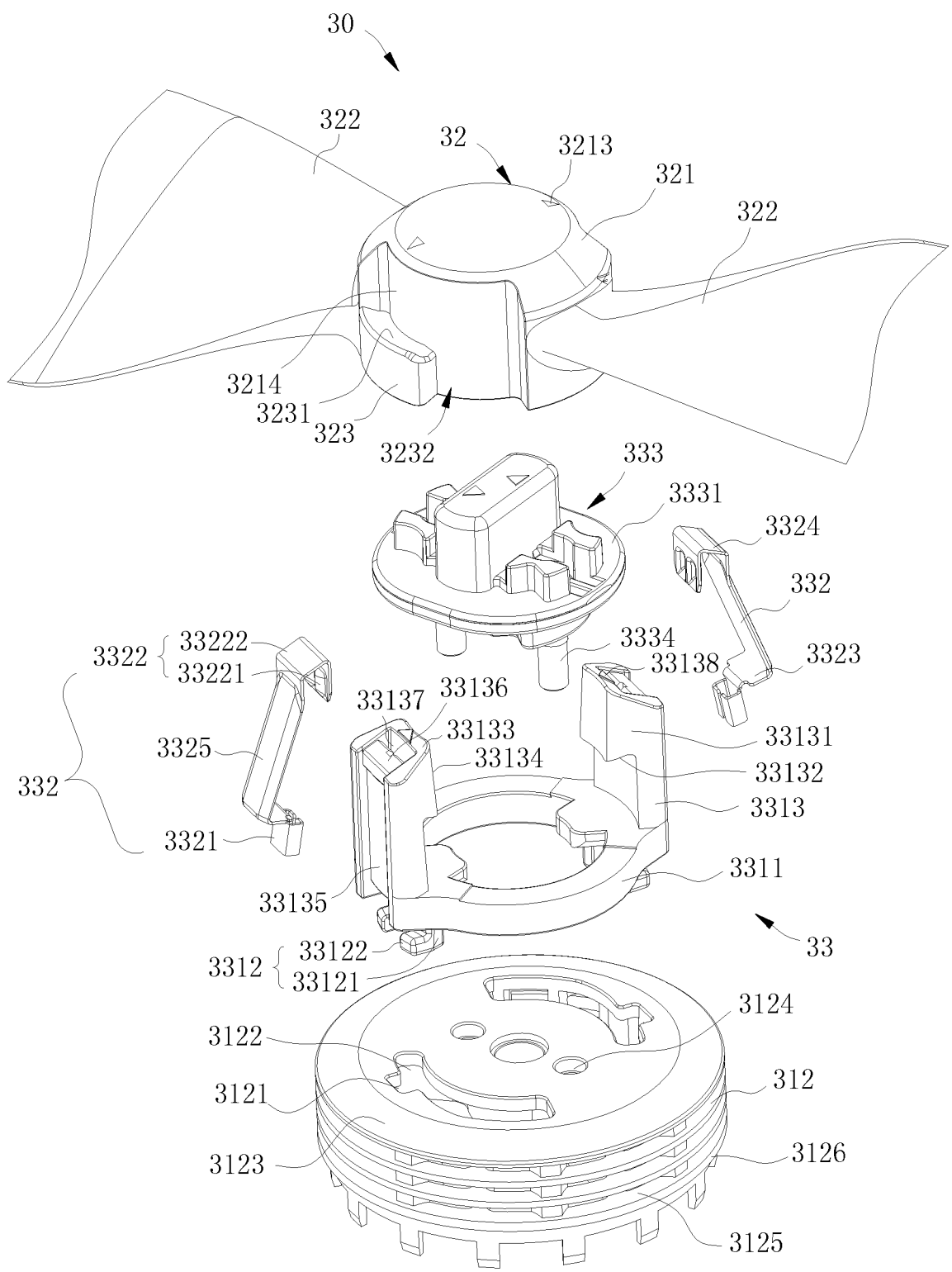
FIG. 4 illustrates a schematic exploded view showing the exemplary rotor-wing assembly of FIG. 2.

FIG. 4 illustrates a schematic exploded view showing the exemplary rotor-wing assembly 30 of FIG. 2. As shown in FIG. 4, the motor 31 includes a rotating portion 312. The rotating portion 312 may have a cylindrical structure. The rotating portion 312 includes an end surface 3123 opposing the propeller 32, and a sidewall 3126 connected to the end surface 3123.

As shown in FIG. 4, the end surface 3123 is formed with one or more first position-limiting structures 3121, one or more guide-rail grooves 3122 extending in the circumferential direction of the propeller disk formed by the rotation of the propeller 32, and one or more position-limiting holes 3124. In some embodiments, the first position-limiting structure 3121 is a position-limiting groove 3121. The position-limiting groove 3121 extends in the circumferential direction of the propeller disk formed by the rotation of the propeller 32. The guide-rail groove 3122 is connected with the position-limiting groove 3121. There are two guide-rail grooves 3122 spaced apart and two position-limiting grooves 3121. Each guide-rail groove 3122 is connected with a position-limiting groove 3121. The two guide-rail grooves 3122 are centrosymmetrically distributed about the central axis 31a of the rotating portion 312, and the two position-limiting grooves 3121 are also centrosymmetrically distributed about the central axis 31a of the rotating portion 312. The position-limiting hole 3124, the guide-rail groove 3124, and the position-limiting groove 3121 are all arranged separately. In some embodiments, as shown in FIG. 4, the number of the position-limiting holes 3124 are two. The two position-limiting holes 3124 are arranged centrosymmetrically about the central axis 31a of the motor 31. In other words, the two position-limiting holes 3124 are arranged centrosymmetrically about the rotation axis 32a of the propeller 32. In some other embodiments, the number of the position-limiting holes 3124 may be one, three, or four, or more. When there are a plurality of position-limiting holes 3124, the plurality of position-limiting holes 3124 may be arranged centrosymmetrically about the central axis 31a of the motor 31. In some embodiments, as shown in FIG. 4, the two position-limiting holes 3124 are each of a circular shape. In some other embodiments, the two position-limiting holes 3124 may have one or more non-circular shapes such as a polygonal shape, an oval shape, an elliptical shape. In some other embodiments, when the number of the position-limiting holes 3124 is more than two, one of the position-limiting holes 3124 may also have a non-circular shape, such as a polygonal shape, an oval shape, and an elliptical shape.

A plurality of heat-dissipating holes 3125 are formed on the sidewall 3126 of the rotating portion 312, such that heat generated by the motor 31 can be dissipated to lower temperature of the motor 31 and prolong the lifetime of the motor 31. To further ensure the effect of heat dissipation and reinforce the strength of the rotating portion 312, the rotating portion 312 may be made of a metal material, such as aluminum alloy.

As shown in FIG. 4, the propeller 32 includes a hub 321, one or more blades 322, and a first locking block 323.

Figure 5:
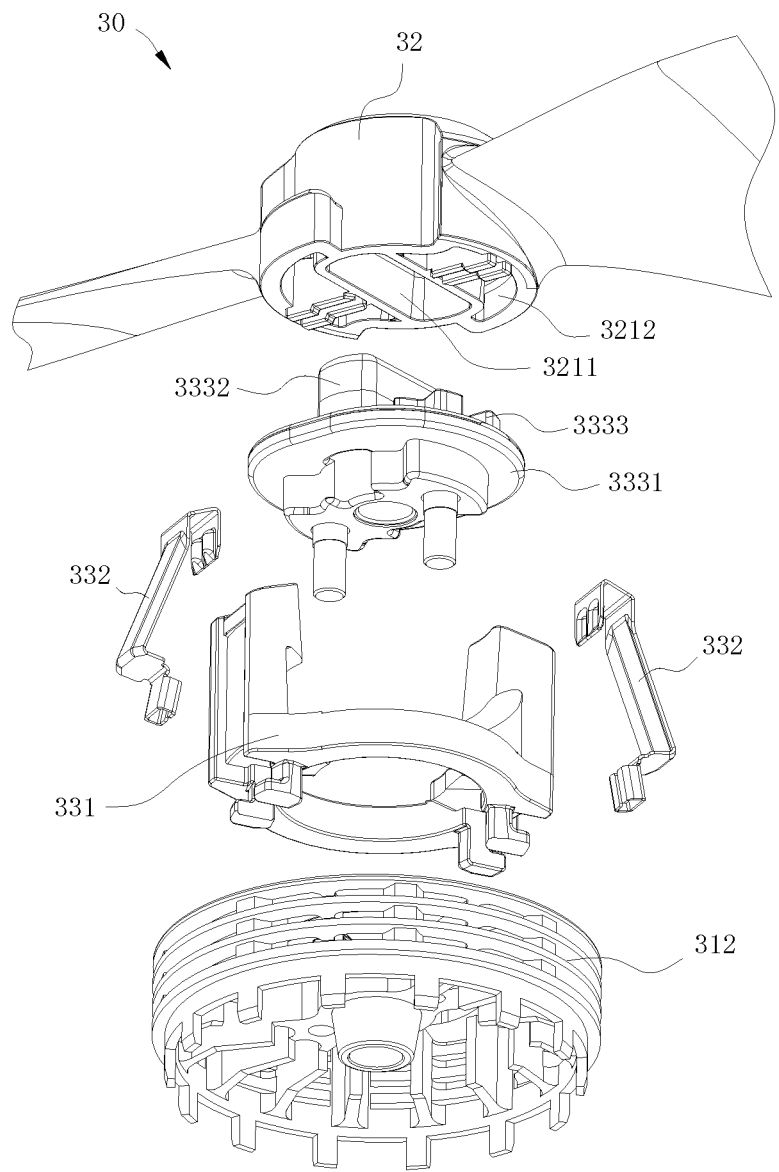
FIG. 5 illustrates a schematic exploded view from another perspective showing the exemplary rotor-wing assembly of FIG. 2.

FIG. 5 illustrates a schematic exploded view from another perspective showing the exemplary rotor-wing assembly 30 of FIG. 2. As shown in FIG. 5, the hub 321 has an approximately cylindrical shape. A connection hole 3211 and one or more mounting holes 3212 are formed at a side of the hub 321 facing the rotating portion 312. The connection hole 3211 is arranged at the center of the hub 321, and the connection hole 3211 may have an oblong shape. In some other embodiments, the connection hole 3211 may also be of another shape, such as a square shape or an elliptical shape. The one or more mounting holes 3212 are arranged around the connection hole 3211.

Referring again to FIG. 4, first alignment marks 3213 are formed at the upper surface of the hub 321. In some embodiments, as shown in FIG. 4, the first alignment marks 3213 have a triangle shape. The first alignment mark 3213 may be of another shape. For example, the first alignment mark 3213 may be in the shape of, e.g., a circle, a square, or an ellipse.

As shown in FIG. 4, the one or more blades 322 are arranged at a peripheral wall 3214 of the hub 321. The number of the blades 322 is two. The two blades 322 are fixed to both sides of the hub 321 in the same radial direction of the hub 321. The blades 322 can rotate to provide power for the UAV 100 to ascend and/or move forward.

As shown in FIG. 4, the first locking block 323 is arranged at the peripheral wall 3214. The first locking block 323 is located between the two blades 322. A space 3232 is formed between the first locking block 323 and one of the blades 322.

As shown in FIG. 4, a first mating surface 3231 is formed on a side of the first locking block 323 facing away from the rotating portion 312. The first mating surface 3231 is an inclined surface, tilted at a certain angle with respect to the rotation axis 32a of the propeller 32. In the direction of the rotation axis 32a, the side of the first mating surface 3231 proximal to the rotation axis 32a is closer to the motor 31 than the side of the first mating surface 3231 distal from the rotation axis 32a.

As shown in FIG. 4, the connection assembly 33 includes a locking member 331, a reinforcing member 332, and a connection member 333. The locking member 331 is configured to lock the propeller 32 to the rotating portion 312. The reinforcing member 312 is configured to reinforce the locking member 331, locking the propeller 32 to the rotating portion 312.

As shown in FIG. 3 and FIG. 4, the locking member 331 includes a mounting portion 3311, a guiding portion 3312, and a locking catch 3313. The mounting portion 3311 is mounted to the rotating portion 312, and the guiding portion 3312 extends from the mounting portion 3311 in the direction away from the propeller 32. The locking catch 3313 extends from the mounting portion 3311 toward the propeller 32.

As shown in FIG. 4, the mounting portion 3311 has an approximately annular shape. In some embodiments, the center of the mounting portion 3311 may coincide with the rotation axis 32a of the propeller 32, thus allowing the locking member 331 to rotate stably around the rotation axis 32a of the propeller 32.

As shown in FIG. 4, the guiding portion 3312 is coupled with the guide-rail groove 3122, guiding the locking member 331 to rotate about the rotation axis 32a of the propeller 32. In some embodiments, as shown in FIG. 4, the guiding portion 3312 includes a guiding section 33121 connected with the mounting portion 3311, and a holding section 33122 connected with the guiding section 33121. The guiding section 33121 is arranged at the guide-rail groove 3122. The holding section 33122 is engaged with the rotating portion 312 to prevent the locking member 331 from being separated from the rotating portion 312. The guiding section 33121 is connected with the holding section 33122 to form a certain angle, such that the holding section 33122 can be retained at the rotating portion 312. The angle formed by the guiding section 33121 and the holding section 33122 may be an acute angle or a right angle. As shown in FIG. 4, there are two guiding sections 33121. Each of the guiding sections 33121 is coupled with a corresponding guide-rail groove 3122, respectively, thus allowing the locking member 331 to be stressed uniformly and rotate stably around the rotation axis 32a of the propeller 32.

As shown in FIG. 4, the locking catch 3313 is coupled with the first locking block 323. When the propeller 32 is locked, the locking catch 3313 may be connected with the first locking block 323, and a second end 3324 of the reinforcing member 332 may be engaged with the locking catch 3313. During installation, the locking catch 3313 may pass through the space 3232, formed between the first locking block 323 and one of the blades 322.

As shown in FIG. 4, a second locking block 33131 is formed at the end of the locking catch 3313 that is connected with the first locking block 323. The second locking block 33131 is coupled with the first locking block 323. The locking member 331 is engaged with the first locking block 323 through the second locking block 33131 to lock the propeller 32.

As shown in FIG. 4, a second mating surface 33132 is formed at the side of the second locking block 33131 that faces the rotating portion 312. The second mating surface 33132 is an inclined surface tilted at a certain angle with respect to the rotation axis 32a of the propeller 32. In the direction of the rotation axis 32a, the side of the second mating surface 33132 proximal to the rotation axis 32a is closer to the motor 31 than the side of the second mating surface 33132 distal from the rotation axis 32a.

Therefore, the two mutually coupled surfaces (the first mating surface 3231 and the second mating surface 33132) of the first locking block 323 and the second locking block 33131 are both inclined surfaces, tilted at a predetermined angle with respect to the rotation axis 32a of the propeller 32. In the direction of the rotation axis 32a, the side of the surface proximal to the rotation axis 32a is closer to the motor 31 than the side distal from the rotation axis 32a. In some embodiments, the two mutually coupled surfaces of the first locking block 323 and the second locking block 33131 may be engaged with each other in an interference-fit manner.

As shown in FIG. 4, the second locking block 33131 also includes a top surface 33133, a first side surface 33134, and a second side surface 33135. The first side surface 33133 is connected with the top surface 33133. The first side surface 33134 is close to and faces the peripheral wall 3214 of the propeller 32. The second side surface 33135 is opposite to the first side surface 33134. A recess 33136 is arranged at the top surface 33133. An engaging hole 33137 is arranged at the bottom of the recess 33136.

As shown in FIG. 4, the top surface 33133 of the second locking block 33131 is formed with a second alignment mark 33138. When the propeller 32 is locked, the second alignment mark 33138 is aligned with the first alignment mark 3213. In some embodiments, the first alignment may be of a triangle shape. The first alignment mark 3213 may also have another shape. For example, the first alignment mark 3213 may be in the shape of, e.g. a circle, a square, or an ellipse.

The locking member 331 may be in an integrally formed structure. For example, the locking member 331 may be formed by an injection-molding process or a die-casting process.

As shown in FIG. 4, a first end 3323 of the reinforcing member 332 is mounted at the rotating portion 312. A second end 3324 of the reinforcing member 332 opposite to the first end 3323 engages with the locking member 331, reinforcing the locking member 331 to lock the propeller 32 to the rotating portion 312.

As shown in FIG. 4, the first end 3323 of the reinforcing member 332 is formed with a second position-limiting structure 3321. The second position-limiting structure 3321 is a position-limiting block 3321 capable of engaging with the position-limiting groove 3121.

As shown in FIG. 4, when the second position-limiting structure 3321 is in a first position, the propeller 32 is in the locked state. The first position-limiting structure 3121 is coupled with the second position-limiting structure 3321, thus fixing the first end 3323 of the reinforcing member 332 to the rotating portion 312.

When the second position-limiting structure 3321 is located at a second position, the locking member 331 is in the unlocked state, such that the locking member 331 can rotate relative to the propeller 32 about the rotation axis 32a of the propeller 32.

If the first position-limiting structure 3121 is the position-limiting groove 3121, and the second position-limiting structure 3321 is the position-limiting block 3321 capable of engaging with the position-limiting groove 3121, then the guide-rail groove 3122 may connect with the position-limiting groove 3121, and the position-limiting block 3321 can move from the position-limiting groove 3121 to the guide-rail groove 3122, such that the locking member 331 can rotate relative to the propeller 32 about the rotation axis 32a.

As shown in FIG. 4, the second end 3324 of the reinforcing member 332 is formed with an engaging hook 3322. The engaging hook 3322 includes an engaging portion 33221 and a contact portion 33222, which are connected to each other at an angle to each other. The engaging portion 33221 is engaged with the engaging hole 33137, and the contact portion 33222 is in contact with the bottom of the recess 33136.

As shown in FIG. 4, the reinforcing member 332 also includes a connection arm 3325 connecting the second position-limiting structure 3321 and the engaging hook 3322. The connection arm 3325 may be made of an elastic material, which may be a metal sheet such as a copper sheet, an iron sheet, or a 301 stainless-steel sheet. The connection arm 3325 may be elastically deformed, such that the position-limiting block 3321 can be engaged with the position-limiting groove 3121, or can be detached from the position-limiting groove 3121 to be disposed in the guide-rail groove 3122.

The reinforcing member 332 may be integrally formed from a metal sheet, such that the reinforcing member 332 can have a higher elasticity. The reinforcing member 332 may be made of a metal, such as copper, iron, or 301 stainless steel. The reinforcing member 332 may be formed, for example, by a stamping process. There may be two reinforcing members 332, and each reinforcing member 332 may be connected to a locking catch 3313.

As shown in FIG. 4 and FIG. 5, the connection member 333 is connected with the propeller 32 and the rotating portion 312. The connection member 333 is detachably mounted at the locking member 331. The connection member 333 includes a connection plate 3331 and a position-limiting shaft 3332 extending from the connection plate 3331 toward the propeller 32. The connection plate 3331 holds against the locking member 331. The position-limiting shaft 3332 is connected to the propeller 32 and can restrict the rotation of the propeller 32 relative to the connection member 333.

As shown in FIG. 5, the position-limiting shaft 3332 matches in shape with the connection hole 3211. In some embodiments, as shown in FIG. 5, the position-limiting shaft 3332 has an oblong shape. In some other embodiments, the connection hole 3211 may be of another shapes, such as a square or an ellipse. The position-limiting shaft 3332 extends to the connection hole 3211, restricting the rotation of the propeller 32 with respect to the connection member 333.

As shown in FIG. 4 and FIG. 5, the connection member 333 also includes a reinforcing block 3333 and a position-limiting post 3334. The reinforcing block 3333 extends from the connection plate 3331 toward the hub 321, and corresponds to the mounting hole 3212 arranged at one side of the hub 321 facing the rotating portion 312. The reinforcing block 3333 is mounted at the mounting hole 3212.

As shown in FIG. 4, the position-limiting post 3334 extends from the connection plate 3331 to the rotating portion 312. The position-limiting post 3334 is connected to the rotating portion 312 by passing through the locking member 331, which restricts the rotation of the connection member 333 relative to the rotating portion 312, such that the rotating portion 312 can drive and rotate the propeller 32 through the connection member 333.

As shown in FIG. 4, the position-limiting post 3334 is engaged with the position-limiting hole 3124, which allows a simpler connecting relationship between the connection member 333 and the rotating portion 312. In some embodiments, as shown in FIG. 4, the position-limiting post 3334 has a circular shape. In some other embodiments, the position-limiting post 3334 may also be in another shape, such as a polygonal shape, an oblong shape, or an elliptical shape. There may be at least two position-limiting posts 3334. The position-limiting hole 3124 may correspond to the position-limiting post 3334. At least two position-limiting posts 3334 may be arranged at the corresponding position-limiting holes 3124.

The position-limiting post(s) 3334 corresponding to the position-limiting hole(s) 3124 means that the position-limiting post(s) 3334 are identical or approximately identical in number and shape to the position-limiting hole(s) 3124, and in terms of position, the position-limiting post(s) 3334 can be inserted into the position-limiting hole(s) 3124.

Figure 6:
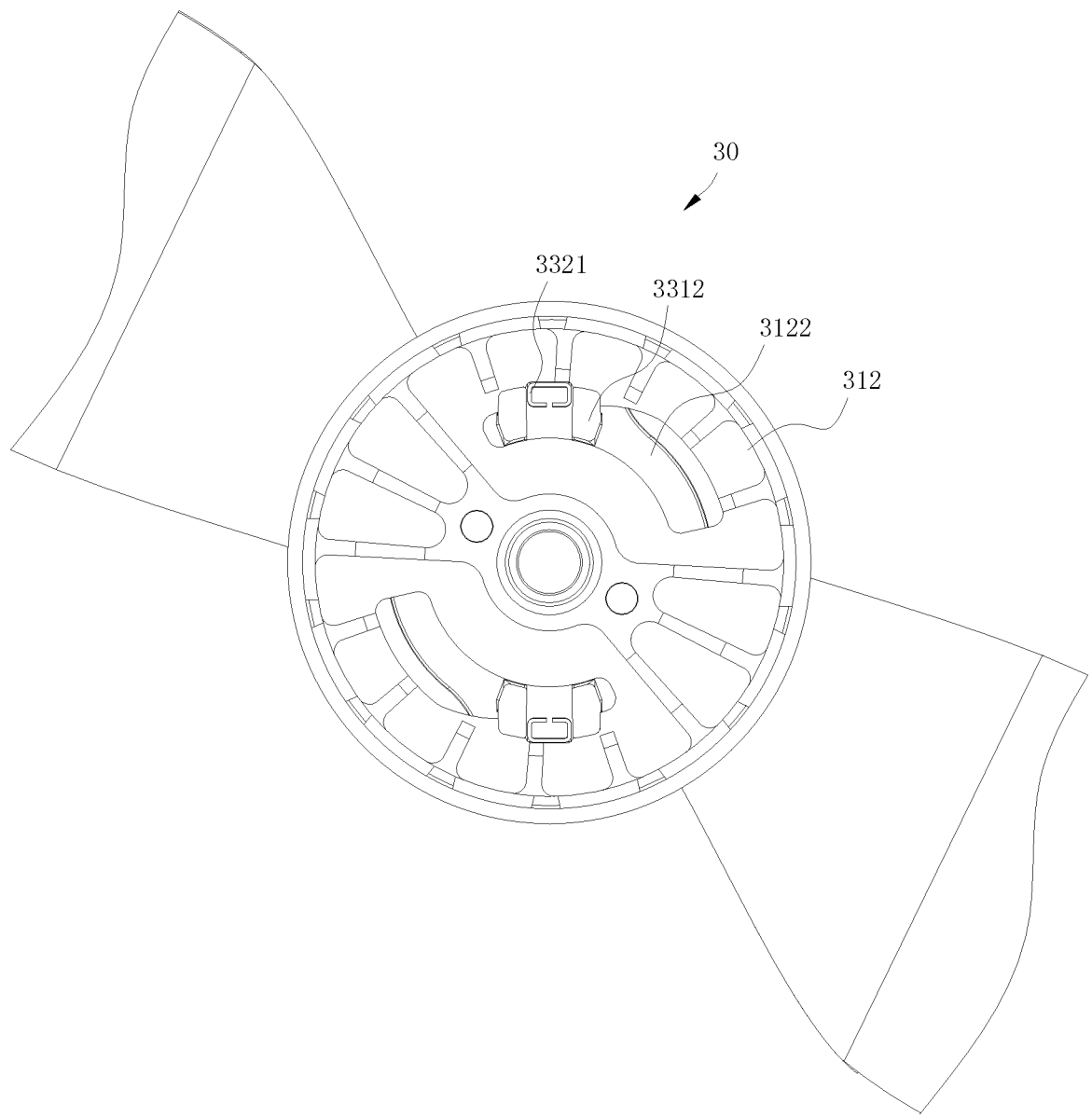
FIG. 6 illustrates a schematic bottom view showing the exemplary rotor-wing assembly of FIG. 2.

FIG. 6 illustrates a schematic bottom view showing the exemplary rotor-wing assembly 30 of FIG. 2. Referring to FIG. 2, FIG. 3, FIG. 4, and FIG. 6, during the assembly of the rotor-wing assembly 30, the engaging hook 3322 may be engaged to the engaging hole 33137, such that the reinforcing member 332 can be mounted to the locking member 331. The locking member 331 with the reinforcing member 332 may be mounted to the rotating portion 312 through the coupling between the guiding portion 3312 and the guide-rail groove 3122. The position-limiting post 3334 of the connection member 333 may be inserted into the position-limiting hole 3124 of the rotating portion 312, thus allowing the connection member 333 to be mounted to the locking member 331. The locking catch 3313 may pass through the space 3232 formed between the first locking block 323 of the propeller 32 and one of the blades 322. The connection hole 3211 and the mounting hole 3212 of the propeller 32 may be aligned and engaged with the position-limiting shaft 3332 and the reinforcing block 3333 of the connection member 333, respectively, such that the propeller 32 can be mounted to the connection member 333. As such, the propeller 32 may be in the unlocked state and can be rotated alongside the rotating portion 312. The position-limiting block 3321 is located to the guide-rail groove 3122. The locking member 331 and the reinforcing member 332 can be rotated alongside the propeller 32. The first alignment mark 3213 of the propeller 32 is not aligned with the second alignment mark 33138 of the locking member 331.

When the propeller 32 needs to switch from the unlocked state to the locked state, the locking member 331 and the reinforcing member 332 may rotate together with respect to the rotation axis 32a of the propeller 32. The first mating surface 3231 may attach to the second mating surface 33132. With the rotation of the locking member 331 and the reinforcing member 332, the position-limiting block 3321 may eject from the guide-rail groove 3122 to the position-limiting groove 3121, such that the locking member 331 cannot rotate relative to the propeller 32. As such, the first alignment mark 3213 may align with the second alignment mark 33138 to complete the locking of the propeller 32.

When the propeller 32 needs to switch from the locked state to the unlocked state, the reinforcing member 332 may be pressed inwardly by hand, which moves the position-limiting block 3321 away from the position-limiting groove 3121 to the guide-rail groove 3122. As such, the locking member 331 can be rotated and the propeller 32 can be switched from the locked state to the unlocked state.

The rotor-wing assembly 30 consistent with the present disclosure can guarantee the flight stability of the UAV 100 consistent with the present disclosure, because the reinforcing member 332 can reinforce the locking member 331 to lock the propeller 32 to the rotating portion 312, which can prevent the locking member 331 from being separated from the propeller 32 and causing the propeller 32 to fly off the motor 31 of the UAV 100.

Moreover, in some embodiments, the first liming structure 3121 may be a position-limiting block. The second position-limiting structure 3321 may be a position-limiting groove capable of engaging with the position-limiting block 3321, which allows a simpler connecting structure between the reinforcing member 332 and the rotating portion 312 as well as a lower cost of the rotor-wing assembly 30.

In addition, in some embodiments, the guide-rail groove 3122 may be connected with the position-limiting groove 3121, such that the position-limiting block 3321 can be engaged with or disengaged from the position-limiting groove 3121.

Further, in some embodiments, the engaging hook 3322 may be coupled with the engaging hole 3313, which allows a simpler connection between the reinforcing member 332 and the locking member 331, thus preventing the rotation of the locking member 331 relative to the propeller 32. The contact portion 33222 may be in contact with the bottom of the recess 33136, which allows a tighter connection between the reinforcing member 332 and the locking member 331. The connection arm 3325 may be made of an elastic material, such that the reinforcing member 332 can be elastic in nature.

In some embodiments, the first position-limiting structure 3121 may be a position-limiting groove. Correspondingly, the second position-limiting structure 3321 may be a position-limiting block capable of engaging with the position-limiting groove.

In some embodiments, the engaging hook 3322 may include an engaging surface engaged with the top surface 33133. The reinforcing member 332 can be directly engaged with the top surface 33133 via the engaging surface to prevent the engaging hook 3322 from falling off the locking member 331.

In some embodiments, the engaging hook 3322 may include two engaging surfaces connected with each other at an angle to each other. The two engaging surfaces may be engaged with the top surface 33133 and the first side surface 33134, respectively.

In some embodiments, the top surface 33133 may be provided with an engaging hole. The engaging hook 3322 may include an engaging portion and a contact portion connected with each other at an angle to each other. The engaging portion may be engaged with the engaging hole. The contact portion may be in contact with the top surface 33133.

In some embodiments, the second side surface 33135 may be provided with an engaging hole. The engaging hook 3322 may be engaged with the engaging hole.

In the description of the present specification, reference to the terms "one embodiment," "some embodiments," "an exemplary embodiment," "an example," "a specific example," or "some examples" means that a description of the detailed embodiment or exemplary-embodiments-described feature, structure, material, or characteristic is included in at least one embodiment or example of the present disclosure In the present specification, a schematic representation of the foregoing terms does not necessarily refer to the same embodiment or example. Furthermore, the particular features, structures, materials, or characteristics described may be combined in any suitable manner in one or more embodiments or examples.

Moreover, the terms "first" and "second" are used for descriptive purpose only and are not to be construed as indicating or implying a relative importance or implicitly specifying the number of the indicated technical features. Thus, features defined with "first" and "second" may explicitly or implicitly include at least one feature. In the description of the present disclosure, "a plurality of" means at least two (e.g., two, three), unless In some embodiments stated otherwise.

Although the principles and the specific embodiments of the present disclosure have been described above, with the instructions of the present disclosure, those skilled in the art can make various modifications and changes on the basis of the described embodiments, all of which fall within the scope of protection of the present disclosure. It should be understood by those skilled in the art that the foregoing description of the present disclosure is only to provide explanation of the present disclosure, not to limit the present disclosure. The scope of protection of the invention is defined by the claims and their equivalents.

What is claimed is:

1. A rotor-wing assembly comprising:
a motor comprising a rotating portion;
a propeller; and
a connection assembly connecting the propeller to the motor and comprising a locking member and a reinforcing member between the propeller and the motor, wherein:
the locking member locks the propeller to the rotating portion;
a first end of the reinforcing member is mounted at the rotating portion, and a second end of the reinforcing member opposite to the first end engages with the locking member, to reinforce the locking member to lock the propeller to the rotating portion;
the rotating portion is formed with a first position-limiting structure;
the first end of the reinforcing member is formed with a second position-limiting structure;
when the second position-limiting structure is in a first position, the propeller is in a locked state, and the first position-limiting structure is coupled with the second position-limiting structure to fix the first end of the reinforcing member to the rotating portion; and
when the second position-limiting structure is in a second position, the propeller is in an unlocked state, and the locking member is capable of rotating relative to the propeller about a rotation axis of the propeller.

2. The rotor-wing assembly according to claim 1, wherein:
one of the first position-limiting structure and the second position-limiting structure is a position-limiting block; and
another one of the first position-limiting structure and the second position-limiting structure is a position-limiting groove configured to engage with the position-limiting block.

3. The rotor-wing assembly according to claim 2, wherein the position-limiting groove extends in a circumferential direction of a propeller disk formed by rotation of the propeller.

4. The rotor-wing assembly according to claim 1, wherein:
the rotating portion is formed with a guide-rail groove extending in a circumferential direction of a propeller disk formed by rotation of the propeller;
the locking member comprises a mounting portion mounted at the rotating portion and a guiding portion extending from the mounting portion in a direction away from the propeller; and
the guiding portion is coupled with the guide-rail groove for guiding the locking member to rotate about the rotation axis.

5. The rotor-wing assembly according to claim 4, wherein:
the guiding portion comprises a guiding section connected with the mounting portion and a holding section connected with the guiding section;
the guiding section is arranged at the guide-rail groove; and
the holding section engages with the rotating portion to prevent the locking member from being separated from the rotating portion.

6. The rotor-wing assembly according to claim 4, wherein:
the first position-limiting structure is a position-limiting groove and the second position-limiting structure is a position-limiting block configured to engage with the position-limiting groove;
the guide-rail groove is connected with the position-limiting groove; and
the position-limiting block is configured to move from the position-limiting groove to the guide-rail groove, such that the locking member is capable of rotating relative to the propeller about the rotation axis.

7. The rotor-wing assembly according to claim 4, wherein:
the locking member further comprises a locking catch extending from the mounting portion to the propeller;
the propeller comprises a hub, a blade arranged at a peripheral wall of the hub, and a locking block arranged at the peripheral wall and coupled with the locking catch; and
when the propeller is locked, the locking catch is connected with the locking block and the second end of the reinforcing member engages with the locking catch.

8. The rotor-wing assembly according to claim 7, wherein:
the locking block is a first locking block;
one end of the locking catch connecting with the first locking block is formed with a second locking block coupled to the first locking block; and
the locking member is engaged with the first locking block to lock the propeller through the second locking block.

9. The rotor-wing assembly according to claim 8, wherein:
two mutually coupled surfaces of the first locking block and the second locking block are both inclined surfaces tilted at a predetermined angle relative to the rotation axis of the propeller; and
in a direction of the rotation axis, sides of the surfaces proximal to the rotation axis are closer to the motor than sides distal from the rotation axis.

10. The rotor-wing assembly according to claim 9, wherein the two mutually coupled surfaces of the first locking block and the second locking block are engaged with each other in an interference fit manner.

11. The rotor-wing assembly according to claim 7, wherein:
the second locking block comprises a top surface, a first side surface connected to the top surface adjacent to and facing the peripheral wall, and a second side surface opposite to the first side surface;
the second end of the reinforcing member is formed with an engaging hook; and
one or more of the top surface, the first side surface, the second side surface, and the engaging hook satisfy at least one of the following:
the engaging hook comprises an engaging surface engaging with the top surface;
the engaging hook comprises two engaging surfaces connected with each other at an angle to each other, and the two engaging surfaces engaging on the top surface and the first side surface, respectively;
the top surface is provided with an engaging hole, the engaging hook comprises an engaging portion and a contact portion connected with each other at an angle to each other, the engaging portion is engaged with the engaging hole, the contact portion is in contact with the top surface;

the top surface is provided with a recess, a bottom of the recess is provided with the engaging hole, the engaging hook comprises the engaging portion and the contact portion connected with each other at an angle to each other, the engaging portion is engaged with the engaging hole, the contact portion is in contact with the bottom of the recess; and the second side surface is provided with the engaging hole, and the engaging hook is engaged with the engaging hole.

12. The rotor-wing assembly according to claim 11, wherein:

the reinforcing member further comprises a connection arm connecting the second position-limiting structure with the engaging hook; and the connection arm is made of an elastic material.

13. The rotor-wing assembly according to claim 7, wherein:

the blade is a first blade;

the propeller further comprises a second blade;

the first locking block is located between the first blade and the second blade; and a space is formed between the first locking block and one of the first blade and the second blade, allowing the locking catch to pass through.

14. The rotor-wing assembly according to claim 7, wherein:

the connection assembly further comprises a connection member connecting the propeller and the rotating portion; and the connection member is configured to be detachably mounted at the locking member.

15. The rotor-wing assembly according to claim 14, wherein the connection member comprises:

a connection plate holding against the locking member; and a position-limiting shaft extending from the connecting plate to the propeller, the position-limiting shaft being connected with the propeller and configured to restrict the rotation of the propeller relative to the connection member.

16. The rotor-wing assembly according to claim 15, wherein:

the connection member further comprises a reinforcing block extending from the connection plate to the hub;

a side of the hub facing the rotating portion is configured with a mounting hole corresponding to the reinforcing block; and the reinforcing block is mounted at the mounting hole.

17. The rotor-wing assembly according to claim 15, wherein:

the connection member further comprises a position-limiting post extending from the connection plate to the rotating portion; and the position-limiting post passing through the locking member is connected to the rotating portion, and is configured to restrict the rotation of the connection member relative to the rotating portion.

18. The rotor-wing assembly according to claim 17, wherein:

the rotating portion comprises an end surface facing the connection member;

the end surface is configured with a position-limiting hole; and the position-limiting post is engaged with the position-limiting hole.

19. An unmanned aerial vehicle comprising:

a rotor-wing assembly comprising:
- a motor comprising a rotating portion;
- a propeller; and
- a connection assembly connecting the propeller to the motor and comprising a locking member and a reinforcing member between the propeller and the motor, wherein:
- the locking member locks the propeller to the rotating portion;
- a first end of the reinforcing member is mounted at the rotating portion, and a second end of the reinforcing member opposite to the first end engages with the locking member, to reinforce the locking member to lock the propeller to the rotating portion;
- the rotating portion is formed with a first position-limiting structure;
- the first end of the reinforcing member is formed with a second position-limiting structure;
- when the second position-limiting structure is in a first position, the propeller is in a locked state, and the first position-limiting structure is coupled with the second position-limiting structure to fix the first end of the reinforcing member to the rotating portion; and
- when the second position-limiting structure is in a second position, the propeller is in an unlocked state, and the locking member is capable of rotating relative to the propeller about a rotation axis of the propeller.

* * * * *